US011144476B2

(12) United States Patent
Coats et al.

(10) Patent No.: US 11,144,476 B2
(45) Date of Patent: Oct. 12, 2021

(54) LEAST RECENTLY USED RANKING IN A MULTI-PORT CACHE

(71) Applicant: Apple Inc., Cupertino, CA (US)

(72) Inventors: Chance C. Coats, Austin, TX (US); Haldun Umur Darbaz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 16/733,187

(22) Filed: Jan. 2, 2020

(65) Prior Publication Data
US 2021/0209032 A1    Jul. 8, 2021

(51) Int. Cl.
| G06F 12/00 | (2006.01) |
| G06F 12/123 | (2016.01) |
| G06F 12/0895 | (2016.01) |
| G06F 9/30 | (2018.01) |
| G06F 12/02 | (2006.01) |
| G06F 12/0811 | (2016.01) |

(52) U.S. Cl.
CPC ........ *G06F 12/123* (2013.01); *G06F 9/30047* (2013.01); *G06F 12/0246* (2013.01); *G06F 12/0811* (2013.01); *G06F 12/0895* (2013.01)

(58) Field of Classification Search
CPC ............. G06F 12/0246; G06F 12/0253; G06F 13/1673; G06F 2212/7201; G06F 2212/7211; G11C 11/4085; G11C 11/409
See application file for complete search history.

(56) References Cited

U.S. PATENT DOCUMENTS

| 6,813,691 | B2 * | 11/2004 | Gaither ............... G06F 12/0804 707/999.002 |
| 7,085,896 | B2 | 8/2006 | Bianchi et al. |
| 8,438,339 | B2 | 5/2013 | Krishna et al. |
| 8,719,509 | B2 | 5/2014 | Wang et al. |
| 9,606,937 | B1 * | 3/2017 | Marathe ................ G06F 12/122 |
| 2003/0105928 | A1 * | 6/2003 | Ash ..................... G06F 12/0871 711/136 |
| 2008/0059707 | A1 * | 3/2008 | Makineni ........... G06F 12/0897 711/122 |

(Continued)

OTHER PUBLICATIONS

Alex Settle et al., "A Dynamically Reconfigurable Cache for Multithreaded Processors," Journal of Embedded Computing, Apr. 2006, 35 pages.

*Primary Examiner* — Prasith Thammavong
(74) *Attorney, Agent, or Firm* — Kowert, Hood, Munyon, Rankin & Goetzel, P.C.

(57) ABSTRACT

An apparatus includes a cache controller circuit and a multi-ported cache memory including a plurality of cache ways. The cache controller circuit is configured to maintain rank values and a threshold value usable to classify the rank values. A given rank value corresponds to a least recently used one of the plurality of cache ways. The cache controller circuit is further configured to receive, in a common access cycle, first and second memory access requests for the cache memory, and, in response to a determination that the first and second memory access requests correspond to respective first and a second cache ways, compare the corresponding rank values for the first and second cache ways to the threshold value. The cache controller circuit is further configured to, based on the comparison, modify the rank value of a selected one of the first and second cache ways.

20 Claims, 10 Drawing Sheets

(56) References Cited

U.S. PATENT DOCUMENTS

| | | | |
|---|---|---|---|
| 2008/0235457 A1* | 9/2008 | Hasenplaugh | G06F 12/0842 |
| | | | 711/130 |
| 2014/0129779 A1* | 5/2014 | Frachtenberg | G06F 12/122 |
| | | | 711/136 |
| 2015/0067266 A1* | 3/2015 | Jafri | G06F 12/0804 |
| | | | 711/136 |
| 2017/0220477 A1* | 8/2017 | Wang | G06F 11/3409 |
| 2018/0081811 A1* | 3/2018 | Al Sheikh | G06F 12/0864 |

* cited by examiner

US 11,144,476 B2

LEAST RECENTLY USED RANKING IN A MULTI-PORT CACHE

BACKGROUND

Technical Field

Embodiments described herein are related to the field of integrated circuits, and more particularly to management of multi-port cache memories.

Description of the Related Art

A computer system or integrated circuit (IC), such as a system-on-a-chip (SoC), may include a hierarchal memory system that includes a system memory and one or more levels of cache memories. The system memory typically has a large storage capacity, but also has long access times for retrieving stored information. Lower level cache memories may provide faster access to stored information than higher level caches, but may have a smaller size to provide the decreased access time. Accordingly, higher level cache memories may have a greater size than lower level cache memories, but may require longer access times to retrieve stored information.

A given cache memory may include one or more cache sets, each cache set including a plurality of cache ways. When data fetched from a higher level cache or memory system is to be cached, an address associated with the data may be mapped to a particular cache set using any of the available ways. Cache memories may track use of the cache ways from a most recently used to a least recently used cache way in order to determine which of the plurality of ways stores data that is not being accessed as frequently as the other cache ways. When a cache hit occurs, the cache way associated with the hit is promoted to the most recently used status.

Cache memories that support multiple processors may be implemented with multi-port access capability, allowing the cache to access two or more entries in a single access cycle. If two or more processors make cache requests in a same access cycle, a decision is made to select one of the two access requests as being the most recent. Accordingly, when two or more cache hits occur in a single access cycle considerations must be made in order to update the recent usage of the cache ways.

SUMMARY OF THE EMBODIMENTS

Broadly speaking, a system, an apparatus, and a method are contemplated in which the apparatus includes a cache controller circuit and a multi-ported cache memory including a plurality of cache ways, each including a plurality of entries. The cache controller circuit may be configured to maintain a plurality of rank values and a threshold value usable to classify the plurality of rank values. A given rank value of the plurality of rank values may correspond to a given least recently used cache way of the plurality of cache ways and is used to select a particular cache way when evicting an entry. The cache controller circuit may be further configured to receive, in a common access cycle, first and second memory access requests for the cache memory. In response to a determination that the first memory access request and the second memory access request correspond to a first cache way and a second cache way, respectively, the cache controller circuit may be configured to compare the corresponding rank values for the first and second cache ways to the threshold value. Based on the comparison, the cache controller circuit may be configured to modify the rank value of a selected one of the first and second cache ways.

In a further example, the cache controller circuit may be further configured to increase the rank value of the selected cache way in response to a determination that a base rank value of the selected cache way satisfies the threshold value. In one example, the cache controller circuit may be further configured to decrease the rank value of the unselected one of the first and second cache ways in response to a determination that a base rank of the unselected cache way does not satisfy the threshold value.

In another example, in response to a determination that a base rank value of the unselected cache way satisfies the threshold value, the cache controller circuit may be further configured to store an identifier for the unselected cache way. In an embodiment, the cache controller circuit may be further configured to increase the rank value of the unselected cache way in a subsequent access cycle.

In one example, the subsequent access cycle corresponds to an access cycle during which no memory access requests generate cache hits in cache ways with respective rank values that satisfy the threshold value are received by the cache controller circuit. In a further example, the cache controller circuit is further configured to, in response to a determination that the respective rank values for both the first and second cache ways satisfy the threshold value, select the one of the first cache way or the second cache way based on a comparison of the respective rank values of the first and second cache ways.

BRIEF DESCRIPTION OF THE DRAWINGS

The following detailed description makes reference to the accompanying drawings, which are now briefly described.

Figure 1:
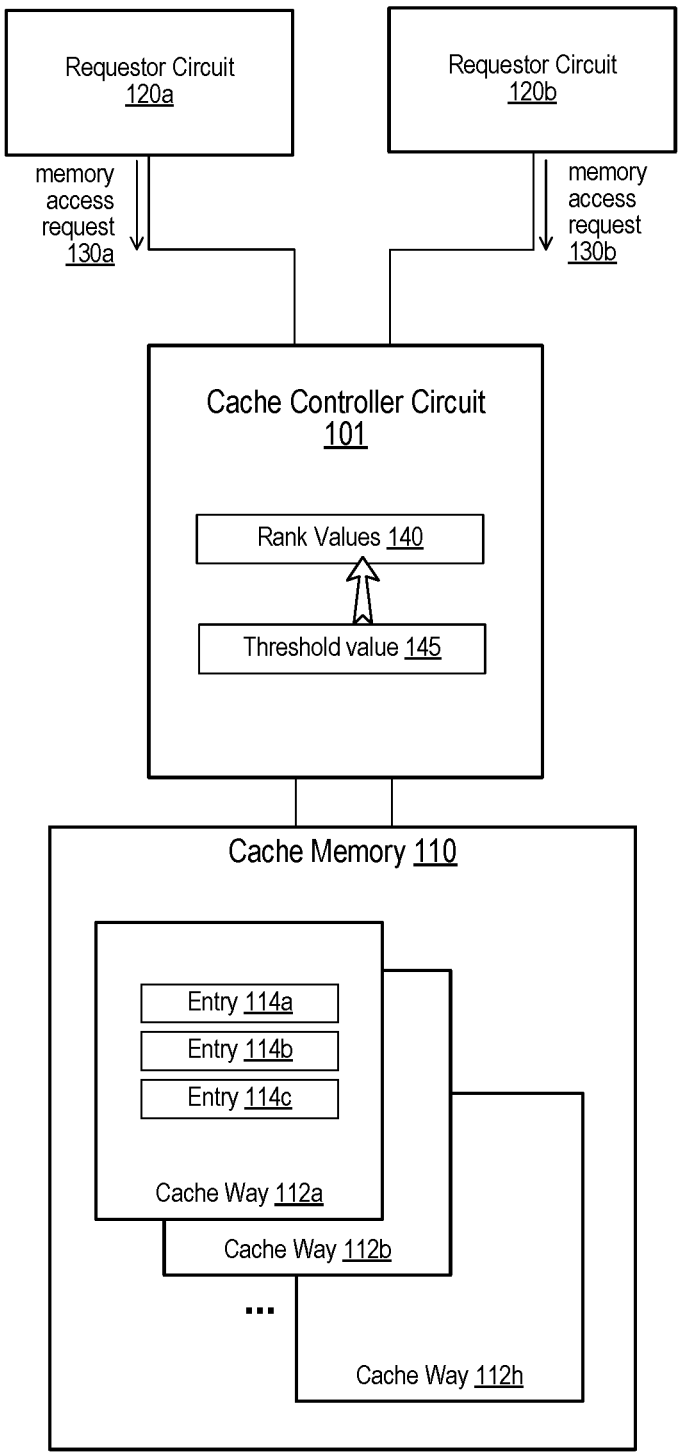
FIG. 1 illustrates a block diagram of an embodiment of a cache subsystem.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

A cache memory with multiple ways may rank use of the multiple ways from a most recently used (MRU) to a least recently used (LRU) cache way. When an entry in a particular cache way is accessed, then the particular cache way is promoted to the MRU cache way position. If an entry in the current LRU cache way is accessed in a subsequent access cycle, then the LRU cache way is promoted to MRU cache way and the particular cache way is shifted down to the second MRU cache way position. All remaining cache ways are similarly shifted down in ranking with the second LRU cache way being demoted down to the new LRU cache way position. If a cache entry needs to be evicted to make room for recently fetched information, a cache controller circuit uses the tracked usage rankings to determine the current LRU cache way, and evicts a corresponding entry in that cache way. The recently fetched information may then be cached in the evicted entry, and the LRU cache way is promoted to MRU cache way and the remaining cache ways are shifted down in ranking.

Multi-port cache memories may be utilized to support multiple processor circuits (referred to herein as "requestor circuits" or simply "requestors"). Requestors may include one or more general purpose processor cores, as well as processors for graphics, audio, digital signal processing, network processing, and the like. In addition, a multi-threaded core may be capable of issuing two or more cache requests in a same access cycle. A multi-port cache memory with multiple cache ways may use the LRU technique for selecting an entry from a particular cache way for eviction. The present inventors have recognized that a multi-ported cache may present issues with respect to implementing LRU policies. For example, if two cache accesses are made to two different cache ways in a single access cycle, then both of the two cache ways should be promoted since they have just been used. In some cache controller circuits, however, more than one access cycle may be required to complete both promotions. If, however, an accessed cache way is not promoted in a timely manner, then entries in the accessed cache way may be at risk of being evicted if it is ranked in the LRU position before receiving the overdue promotion. To avoid evicting an entry from a recently used cache way, a complex circuit may be utilized to perform the decision making in fewer access cycles. Complex circuits, however, may increase power consumption and/or add die size to the cache controller circuit.

Embodiments of apparatus are disclosed that, in response to two or more cache ways being accessed in a single access cycle, are capable of identifying one of the accessed cache ways that is at a higher risk of being evicted. The disclosed embodiments are capable of performing the identification in a single access cycle and may be implemented without using complex logic circuits. In response to receiving two memory access requests that hit in respective cache ways of a multi-ported cache memory, a disclosed embodiment compares a recent use ranking for each respective cache way to a threshold ranking value. In some embodiments, this threshold ranking value may be used to classify rank values for different cache ways (e.g., establishing a "safe zone" of ways that are at less risk for eviction, and a "danger zone" of ways that are at a higher risk for eviction. If a respective cache way's ranking is above the threshold, then the ranking is not changed. If the respective cache way's ranking is below the threshold, then that cache way's ranking is modified.

A block diagram for an embodiment of a cache subsystem is illustrated in FIG. 1. Cache subsystem 100 may be included in a computer system such as a desktop computer, laptop computer, smartphone, tablet, wearable device, and the like. In some embodiments, the circuits described herein may be implemented on a system-on-chip (SoC) or other type of integrated circuit. Cache subsystem 100 includes cache controller circuit 101, coupled to cache memory 110 and requestor circuits 120a and 120b. Cache memory 110 includes a plurality of cache ways 112a-112h.

Cache memory 110 is a multi-port cache memory including a plurality of cache ways, each cache way including a plurality of entries, such as entries 114a-114c. The entries of cache memory 110 are implemented using arrangements of memory cells. To support multi-port access, the memory cells are designed to support two or more accesses in a single access cycle. In other embodiments, however, single-port memory cells may be utilized, in which the memory cells have access times that are adequately fast to allow two or more accesses in a single cycle, allowing use of a time-domain multiplexing technique.

As illustrated, cache memory 110 caches information for use by requestor circuits 120a and 120b. Requestor circuits 120a and 120b may be any suitable processing circuit capable of issuing memory requests, such as general-purpose processor cores, graphics processing cores, and the like. In various embodiments, requestor circuits 120a and 120b may or may not be a same type of processing circuit. Requestor circuits 120a and 120b issue various memory requests that are received by cache controller circuit 101. These memory requests include requests to read or write information stored at a particular address in a memory system that is accessible to requestor circuits 120a and 120b. The stored information may be program instructions to be executed by the corresponding requestor circuit, may be data to be consumed by the corresponding requestor circuit, or a combination thereof.

Cache controller circuit 101 includes circuitry for receiving these various memory requests. This included circuitry may include combinational and/or sequential logic for performing the disclosed functions. After receiving a given memory request, cache controller circuit 101 determines if the given memory request is a hit or a miss in cache memory 110. If an entry in cache memory 110 corresponds to the given memory request, then the given memory request is a hit, and information stored in the entry is returned to the requestor circuit that issued the corresponding request. Otherwise, if no cache entry matches the given memory request, then that memory request is a miss and the given memory request is forwarded to a higher-level memory (e.g., a higher-level cache memory or a system memory). When information is returned from the higher-level memory, the returned information is stored in a corresponding entry in a selected one of cache ways 112a-112h.

Memory addresses used in the memory requests are mapped to a particular entry in each of cache ways 112a-112h. This mapping typically varies between cache ways such that a particular memory address will map to a different entry within each one of cache ways 112a-112h. To select an entry in one of cache ways 112a-112h, cache controller circuit 101 determines if a mapped entry in any of cache ways 112a-112h is available. If none of the mapped entries are available, then cache controller circuit 101 selects one of the filled entries for eviction. To select one of the cache ways from which to evict an entry, cache controller circuit 101 is configured to maintain rank values 140, wherein a given rank value of rank values 140 corresponds to a given least recently used cache way of the plurality of cache ways 112a-112h and is used to select a particular cache way when evicting an entry. Cache controller circuit 101 is further configured to maintain threshold value 145 that is usable to classify rank values 140.

As illustrated, when cache controller circuit 101 receives a memory request that hits an entry in a particular one of cache ways 112a-112h in cache memory 110, the particular cache way is promoted to the MRU rank, and the other cache ways are demoted accordingly. If, however, cache controller circuit 101 receives two or more memory requests in a same access cycle, then cache controller circuit 101 uses a different technique for adjusting rank values 140. This different technique utilizes a comparison of rank values of cache ways that are hit by the two or more memory requests to a threshold value. This threshold value is used to identify a cache way with a rank value that puts the cache way at risk of being selected for an eviction operation. Accordingly, cache ways with rank values that satisfy the threshold value may be referred to as "at-risk" cache ways, as they are more at-risk of being evicted sooner than cache ways with rank values that do not satisfy the threshold value.

In this different technique, cache controller circuit 101 receives, in a common access cycle, memory access requests 130a and 130b for cache memory 110. As used herein, a "memory access cycle," or simply "access cycle," refers to a period of time during which the cache controller circuit receives a memory access request and determines if the memory access request is a hit or a miss, and in the case of a hit, returns the requested data. In various embodiments, a memory access cycle may correspond to one or more clock cycles of a system clock.

In response to a determination that memory access request 130a and memory access request 130b correspond to a first cache way (e.g. cache way 112b) and a second cache way (e.g., cache way 112h), cache controller circuit 101 is configured to compare, the corresponding rank values 140 for the first and second cache ways to threshold value 145. For example, a base rank value for cache way 112b may be 'two,' corresponding to second MRU, while a base rank value for cache way 112h is 'eight,' corresponding to LRU. If threshold value 145 is 'five,' then the base rank value of cache way 112b is below threshold value 145 (not satisfying the threshold), while the base rank value of cache way 112h is above threshold value 145 (satisfying the threshold). Cache way 112h is selected for promotion based on the base rank value being above threshold value 145. Cache controller circuit 101, based on the comparison, modifies the rank value of the selected one of the first and second cache ways (cache way 112h). More specifically, cache controller circuit 101 is configured to increase the rank value of cache way 112h in response to a determination that the base rank value of cache way 112h satisfies threshold value 145. In addition, cache controller circuit 101 is further configured to decrease the rank value of cache way 112b in response to the determination that the base rank of cache way 112b does not satisfy threshold value 145. Further details regarding the modification of rank values 140 will be disclosed below in regards to FIGS. 3-7.

Use of the threshold value may allow a cache controller circuit to identify an accessed cache way, from a group of two or more accessed cache ways, that has a higher risk of being selected for an eviction operation. By identifying a most at-risk cache way from a group of accessed cache ways, the cache controller circuit can promote the identified cache way to a higher ranking, thereby reducing the risk of this cache way being selected for an eviction operation. Furthermore, to identify and promote the most at-risk cache way from the group, the cache controller circuit may not require complex circuits since the promotion occurs to one cache way in an access cycle.

It is noted that cache subsystem 100 illustrated in FIG. 1 is merely an example. The illustration of FIG. 1 has been simplified to highlight features relevant to this disclosure. Various embodiments may include different configurations of the circuit blocks, including additional circuit blocks such as additional requestor circuits and/or a different number of cache ways in the cache memory.

The processor circuit illustrated in FIG. 1 is illustrated with a single set of cache ways. In other embodiments, a processor circuit may include one or more cache memories with more than one set of cache ways. An example of such a processor circuit is shown in FIG. 2.

Figure 2:
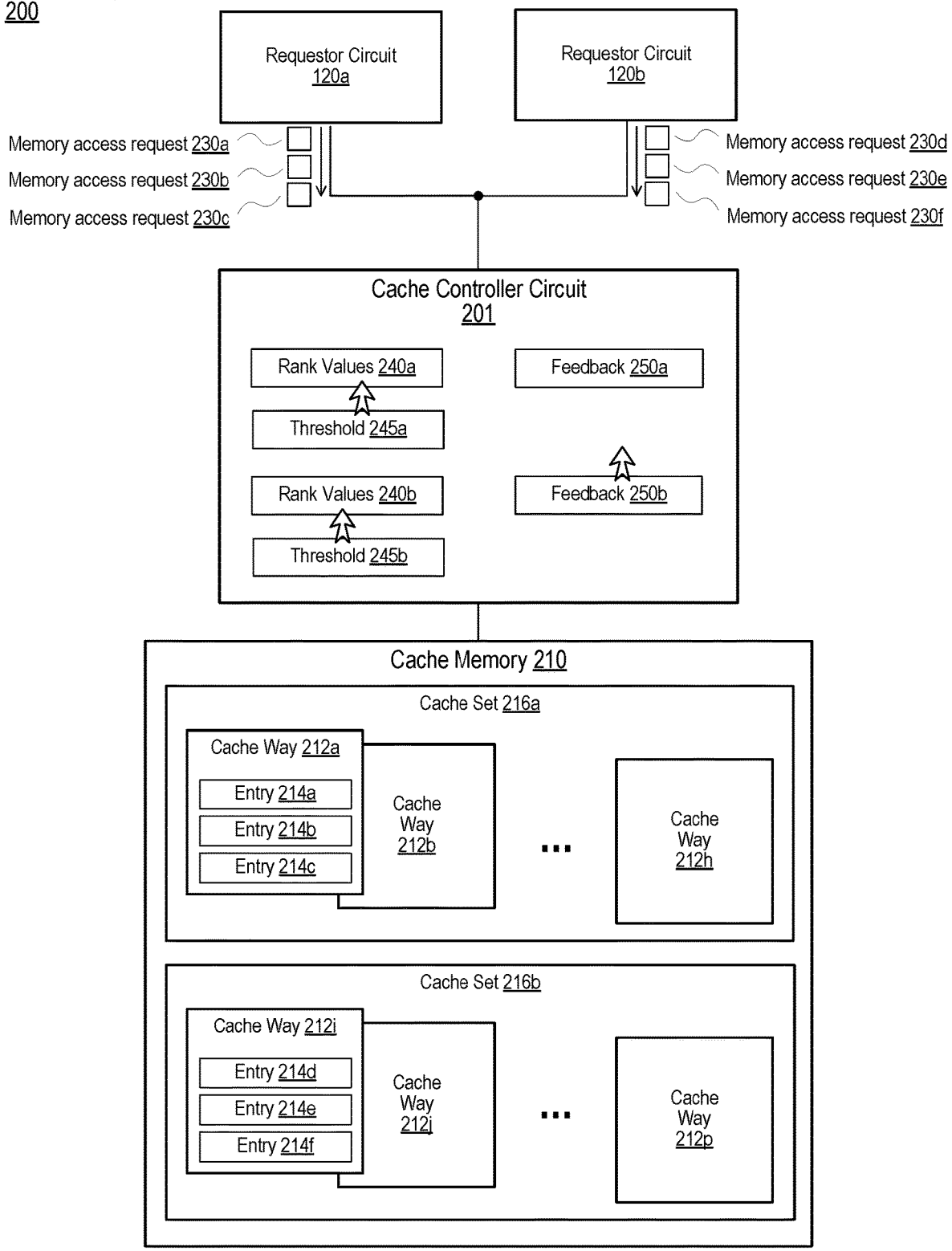
FIG. 2 shows a block diagram of another embodiment of a cache subsystem.

Moving to FIG. 2, a block diagram of an embodiment of a cache subsystem with multiple cache sets in the cache memory is shown. As illustrated, cache subsystem 200 includes cache controller circuit 201 coupled to cache memory 210. Cache memory 210 includes cache sets 216a and 216b, each including a respective portion of cache ways 212a-212p. Each of cache ways 212a-212p includes a respective plurality of entries 214 (for clarity, only entries 214a-214f are shown). Cache controller circuit 201 receives memory requests 230a-230c from requestor circuit 120a and memory requests 230d-230f from requestor circuit 120b.

Cache controller circuit 201, as illustrated, includes circuitry for receiving memory requests 230a-230f In a similar manner as cache controller circuit 101 in FIG. 1, circuitry included in cache controller circuit 201 may include combinational and/or sequential logic for performing the disclosed functions. Cache controller circuit 201 is configured to fulfill memory requests 230a-230f using entries in cache memory 210 when a particular memory request hits a corresponding entry, or indicate a cache miss if a corresponding entry is not found. Cache memory 210, similar to cache memory 110, is a multi-ported cache memory including a plurality of cache sets (cache sets 216a and 216b), each cache set including a plurality of entries. Each memory address used in cache subsystem 200 is mapped to a respective one of cache sets 216a and 216b. A given memory address is mapped to each cache way within the respective one cache set in a similar manner as described above for cache memory 110.

Cache controller circuit 201 is configured to, for a particular one of cache sets 216a and 216b, maintain respective rank values for a plurality of cache ways associated with the particular cache set, wherein a particular rank value is based on a recent use of a corresponding one of the plurality of cache ways. As shown, cache controller circuit 201 is configured to maintain a respective set of rank values for each of cache sets 216a and 216b. Rank values 240a corresponds to cache set 216a and rank values 240b correspond to cache set 216b. In addition, cache controller circuit 201 is further configured to maintain a threshold value usable to classify the plurality of cache ways associated with the particular cache set. As shown, threshold 245a sets a threshold value for comparison to rank values 240a, and threshold 245b sets a threshold value for comparison to rank values 240b. In other embodiments, however, a single threshold value may be used for both sets of rank values.

In a common access cycle, cache controller circuit 201 is further configured to receive first and second memory access requests for memory locations that correspond to entries in respective first and second cache ways of the plurality of cache ways. For example, cache controller circuit 201 receives memory access request 230a from requestor circuit 120a and memory access request 230d from requestor circuit 120b within a same access cycle. If both memory accesses result in hits to different cache ways within a same one of cache set 216a or 216b, then cache controller circuit 201 may select and promote the rank of one of the hit cache ways. To determine which cache way to select for rank promotion, cache controller circuit 201 is configured to compare respective base rank values for the first and second cache ways to the threshold value, and increase the rank value of the first cache way in response to a determination that the base rank value of the first cache way satisfies the threshold value.

As an example, cache controller circuit 201 receives memory access request 230a from requestor circuit 120a and memory access request 230d from requestor circuit 120b in a common access cycle. Cache controller circuit 201 determines that memory access request 230a hits an entry in cache way 212b in cache set 216a, and that memory access request 230d hits an entry in cache way 212h, also in cache set 216a. Since cache controller circuit 201 has received two memory access requests that hit different ones of cache ways 212a-212h within the same cache set 216a, cache controller circuit 201 may promote the corresponding rank value of a selected one of the two hit cache ways. Cache controller circuit 201 determines a base rank value for each of cache ways 212b and 212h from rank values 240a. These two base rank values are compared to threshold 245a.

If neither rank value satisfies threshold 245a, then both corresponding cache ways 212b and 212h may be considered safe from being identified as the least recently used cache way for at least several subsequent access cycles. Cache controller circuit 201, therefore, does not promote either rank value. If only one of the two rank values satisfies threshold 245a (e.g., the base rank value for cache way 212b), then the one rank value that satisfies threshold 245a may be the LRU position, or be in jeopardy of being the LRU position within a next few access cycles. As a result, cache controller circuit 201 promotes the rank value of cache way 212b to the MRU position. Other rank values, including the rank value corresponding to cache way 212h, are shifted lower to allow the promoted rank value to occupy the MRU position.

If both rank values satisfy threshold 245a, then both cache ways 212b and 212h may be in jeopardy of being in the LRU position. Cache controller circuit 201 performs a second comparison between the respective rank values for cache ways 212b and 212h. Cache controller circuit 201 promotes the rank value of the cache way (e.g., cache way 212b) that is closer to the LRU position. In some embodiments, the rank value of the unpromoted cache way (cache way 212h) may not be promoted until another memory access request hits in cache way 212h. In other embodiments, cache controller circuit 201 is further configured to store, in response to a determination that the base rank of cache way 212h satisfies threshold 245a and is greater than the base rank value of cache way 212b, an identifier for cache way 212h in feedback 450a. Feedback 450a and 450b are storage circuits (e.g., registers, RAM, and the like) used to store an identifier for a cache way that is to be promoted in a subsequent access cycle.

In an embodiment that uses identifiers for unpromoted cache ways, the promotion of the rank value of cache way 212h may occur in a different access cycle when subsequently received memory access requests do not satisfy threshold 245a. For example, in a different access cycle, cache controller circuit 201 receives third and fourth memory access requests (e.g., memory access requests 230b and 230e). If a memory location for memory access request 230b corresponds to an entry in cache way 212a of cache set 216a, and memory access request 230e results in a hit in cache set 216b, then in response to a determination that a base rank value of cache way 212a does not satisfy threshold 245a, cache controller circuit 201 increases the rank value of cache way 212h, identified by feedback 450a. Since cache way 212h is closer to the LRU position than cache way 212a, the rank value of cache way 212h is promoted. A rank value of memory access request 230e is not considered in this embodiment since it hits in a different cache set.

In the disclosed examples, two memory requests are described as being received in a common access cycle. It is contemplated that the disclosed techniques can be applied to embodiments in which three or more memory requests are received in a common access cycle.

It is noted that the embodiment of FIG. 2 is merely an example to demonstrate the disclosed concepts. In other embodiments, a different combination of circuits may be included. For example, in the illustrated embodiment, although two cache sets are shown, any suitable number of cache sets may be included in the cache memory.

FIGS. 1 and 2 depict block diagrams of circuits for managing rankings of cache ways in multi-port cache memories. FIGS. 3-7 illustrate various examples of updating rank values for a plurality of cache ways in response to receiving a plurality of memory access requests in a same access cycle.

Figure 3:
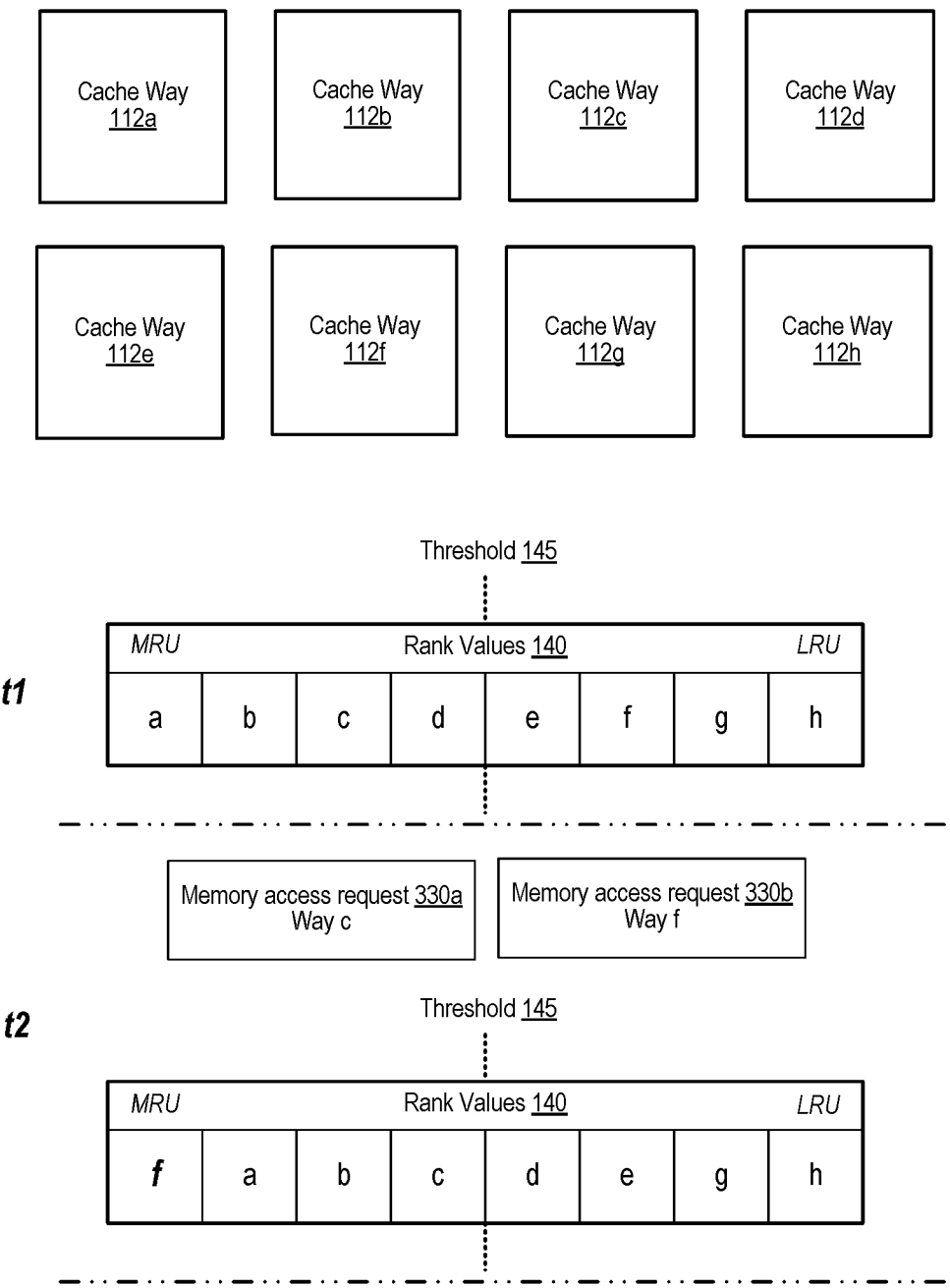
FIG. 3 depicts a state, at two different points in time, of a register for storing rankings of a plurality of cache ways that are included in an embodiment of the cache subsystem of FIG. 1.

Turning to FIG. 3, a block diagram of an embodiment of a portion of a cache subsystem, such as cache subsystem 100 in FIG. 1, is illustrated. Eight cache ways are shown in FIG. 3, cache ways 112a-112h. In addition, rank values 140 are shown at two points in time, t1 and t2. Threshold value 145 is depicted as being set midway in rank values 140, with four positions on either side of threshold value 145. The example of FIG. 3 demonstrates how a cache controller circuit operates in response to receiving two memory request in a single access cycle and a first request satisfies the threshold value while a second request does not.

At time t1, cache ways 112a-112h are ranked from cache way 112a (represented as "a" in rank values 140) is in the MRU position and cache way 112h (represented by "h" in rank values 140) is in the LRU position and, therefore, is at risk of being evicted if a cache miss occurs. Rank values 140 at time t1 may also be referred to as base rank values at time t2. It is noted that rank values 140 may be stored, in various embodiments, in any suitable RAM or register circuit.

At time t2, cache controller circuit 101 receives two memory access requests. Memory access request 330a hits an entry in cache way 112c, while memory access request 330b hits an entry in cache way 112f. As described above, cache controller circuit 101, in response to determining that the memory access request 330a and memory access request 330b hit respective entries in a first cache way and a second cache way, uses threshold value 145 to select either cache way 112c or cache way 112f, and modifies the rank value of the selected cache way.

In the illustrated example, cache controller circuit 101 is configured to increase the rank value of the selected cache way in response to a determination that a base rank value of the selected cache way satisfies the threshold value. As shown, the base rank value of cache way 112f satisfies the threshold by having a less recently used ranking than threshold value 145. Cache controller circuit 101 is further configured to decrease the rank value of the unselected cache way in response to a determination that a base rank of the unselected cache way does not satisfy the threshold value. The base rank value of cache way 112c does not satisfy the threshold as it has a more recently used ranking than threshold value 145. Cache controller circuit 101 selects and promotes cache way 112f into the MRU position. Rank values for all cache ways from the former MRU position (cache way 112a) to the position immediately in front of the base rank value of cache way 112f (cache way 112e) are shifted down by one position. As a result, the rank value of cache way 112c is demoted by one position.

It is noted that rank values for cache ways 112g and 112h do not change since their respective rank values 140 were below the base rank value of cache way 112f. It is also noted that the rank value of cache way 112d moves from above threshold value 145 to below threshold value 145.

Furthermore, it is noted that the example of FIG. 3 is merely to demonstrate the disclosed concepts. In other embodiments, a different number of cache ways may be included in the cache memory. In addition, more than three memory access requests may be received in a single access cycle in some cases.

Figure 4:
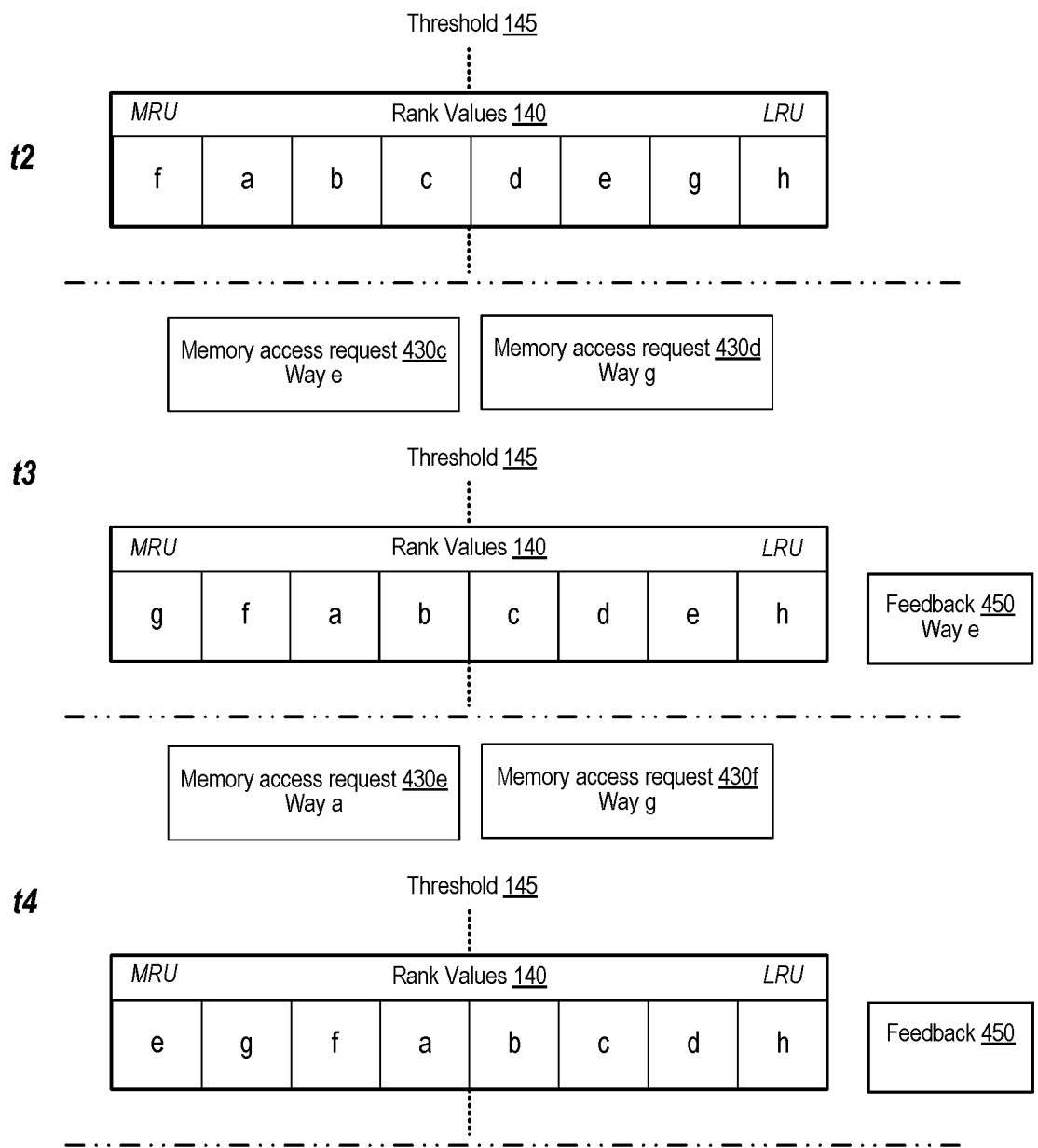
FIG. 4 illustrates, at three different points in time, a state of the register for storing rankings of the plurality of cache ways shown in FIG. 3.

Proceeding to FIG. 4, the embodiment FIG. 3 is shown for additional points in time. Rank values 140 are shown at three points in time, starting at time t2 from FIG. 3 and proceeding to times t3 and t4. The example of FIG. 4 demonstrates how a cache controller circuit operates in response to receiving two memory request in a single access cycle and both requests satisfy the threshold value.

As shown, rank values at time t2 form the base rank values for time t3. The threshold value, threshold value 145, remains the same as in FIG. 3, set at the midway point between the LRU and MRU positions. At time t3, memory access requests 430c and 430d are received in a common access cycle. Memory access request 430c hits an entry in cache way 112e, while memory access request 430d hits an entry in cache way 112g.

To select one of cache way 112e or cache way 112g, cache controller circuit 101 is configured, in response to a determination that the respective rank values 140 for both cache ways 112e and 112g satisfy threshold value 145, to select the one of cache way 112e or cache way 112g based on a comparison of the respective rank values 140 of cache ways 112e and 112g. Cache controller circuit 101 selects the particular one of cache ways 112e and 112g with the lowest base rank value 140. As shown in the base rank values 140 at time t2, the base rank value of cache way 112g (second LRU) is lower than the base rank value of cache way 112e (third LRU). Accordingly, cache controller circuit 101 selects cache way 112g for promotion, as shown in rank values 140 at time t3. Cache way 112g is promoted to the MRU position. Cache ways 112f, 112a, 112b, 112c, 112d, and 112e are each demoted by one position to open the MRU position for cache way 112g.

In the illustrated embodiment, cache controller circuit 101 is further configured to store an identifier for the unselected cache way 112e in response to a determination that the base rank value of cache way 112e satisfies threshold value 145 and is greater than the base rank value of cache way 112g. As shown, cache controller circuit 101 stores an identifier for cache way 112e in feedback 450. Feedback 450, in a similar manner as feedback 250a and 250b in FIG. 2, in various embodiments, may be implemented as a location in a RAM or a register (or portion thereof) within cache subsystem 100, or any other suitable storage circuit. Cache controller circuit 101 is configured to increase the rank value of the unselected cache way 112e in a subsequent access cycle. A subsequent access cycle may correspond to an access cycle during which no memory access requests generate cache hits in cache ways with respective rank values that satisfy threshold value 145 are received by cache controller circuit 101. An access cycle in which no memory access request generates a hit to an "at-risk" cache way may be referred to as an "idle access cycle" for rank promotion.

For example, at time t4, cache controller circuit 101 receives two new memory access requests 430e and 430f, corresponding to cache ways 112a and 112g, respectively. Rank values 140 for both cache ways 112a and 112g are above threshold value 145, and therefore, do not satisfy the threshold value. Cache controller circuit 101, therefore, does not select either of cache ways 112a and 112g for rank promotion, allowing for an access cycle in which cache controller circuit 101 can instead select cache way 112e as identified in feedback 450 for promotion. Cache controller circuit 101 promotes the rank of cache way 112e to the MRU position as shown in rank values 140 at time t4. The identifier of cache way 112e is removed from feedback 450. In some embodiments, feedback 450 may be capable of storing identifiers for a plurality of unpromoted cache ways. In such embodiments, if two or more cache ways are identified in feedback 450 during a given idle access cycle, then cache controller circuit may use the current rank values of the identified cache ways to select the cache way with the lower rank value for promotion.

In a different example, at time t4 cache controller circuit receives, instead of memory access requests 430e and 430f, a single memory access request that hits an entry in cache way 112h, the rank value of which satisfies threshold value 145. Cache controller circuit 101 is configured to increase the rank value of cache way 112h in response to determining that the base rank value of cache way 112h is lower than the base rank value of the identified cache way 112e. The rank value 140 of cache way 112h is promoted to the MRU position and the identifier for cache way 112e remains in feedback 450.

Figure 5:
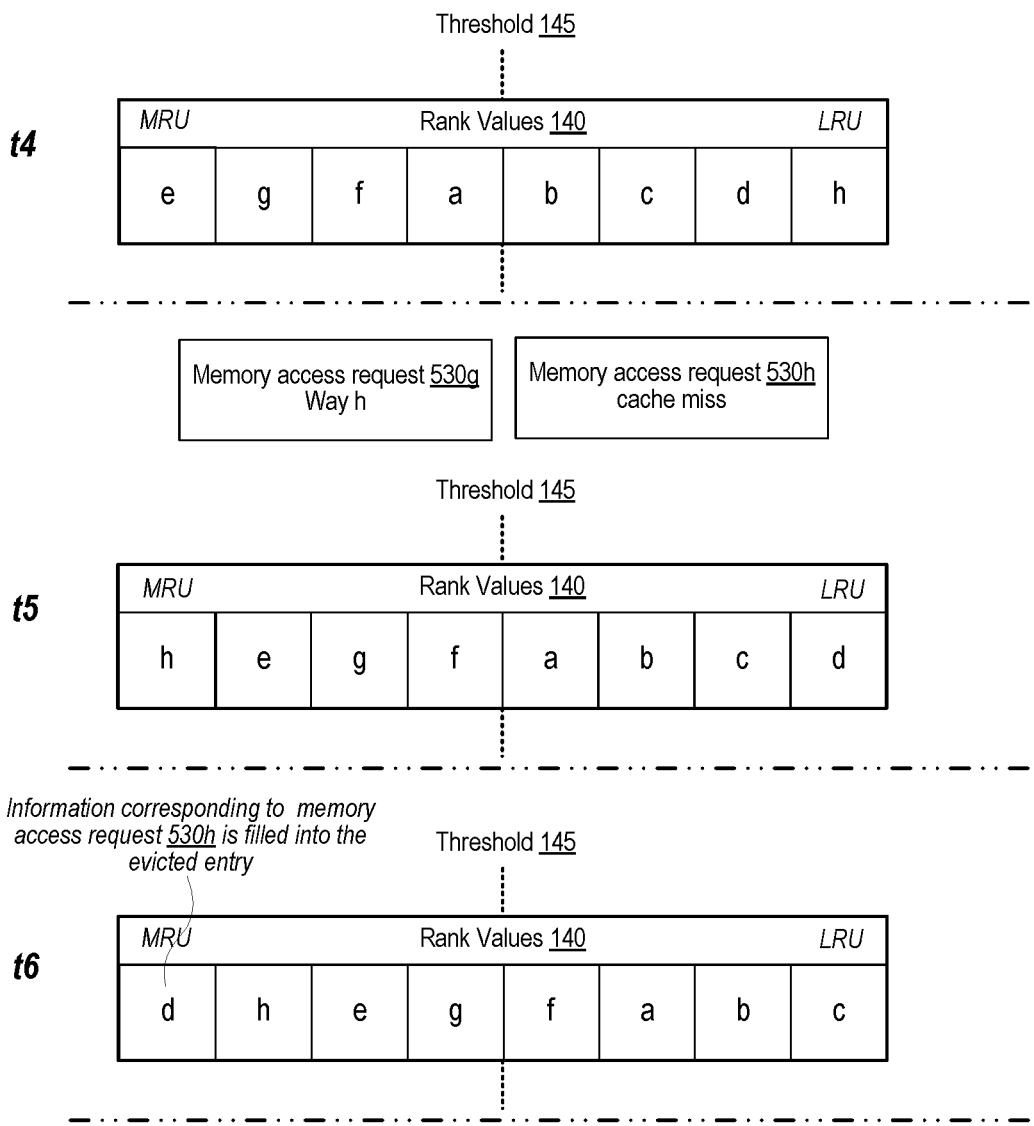
FIG. 5 shows, at three additional points in time, a state of the register for storing rankings of the plurality of cache ways shown in FIG. 3.

Moving now to FIG. 5, the embodiment of FIGS. 3 and 4 is shown for three subsequent points in time from FIG. 4. Rank values 140 are shown starting at time t4 from FIG. 4 and proceeding to times t5 and t6. The example of FIG. 5 illustrates how a cache controller circuit operates in response to receiving two memory request in a single access cycle in which one memory access requests hits an entry in the cache way in the LRU position and the other memory access request is a cache miss.

As shown, rank values 140 at time t4 establish base rank values for the cache ways 112a-112h at time t5. Cache controller circuit 101 in an access cycle at time t5, receives memory access requests 530g and 530h, wherein a memory location for memory access request 530g corresponds to an entry in cache way 112h, and memory access request 530h results in a cache miss. In response to a determination that a base rank value of cache way 112h satisfies threshold value 145, cache controller circuit increases the rank value of cache way 112h. As shown, the rank value 140 for cache way 112h is promoted from the LRU position, to the MRU position.

Due to the cache miss of memory access request 530h, cache controller circuit 101 evicts an entry in the cache way with the lowest rank value (the LRU position). Since cache way 112h is promoted to the MRU position before an eviction is performed for memory access request 530h, cache way 112h avoids eviction and cache way 112d, which has just been demoted into the LRU position, is evicted instead. Other circuits (not illustrated in FIGS. 1-5) fetch information related to memory access request 530h. Cache controller circuit 101 fills the evicted entry in cache way 112d with information corresponding to memory access request 530h. Furthermore, cache controller circuit 101 increases the rank value of the filled entry in cache way 112d to the MRU position, as shown at time t6.

Figure 6:
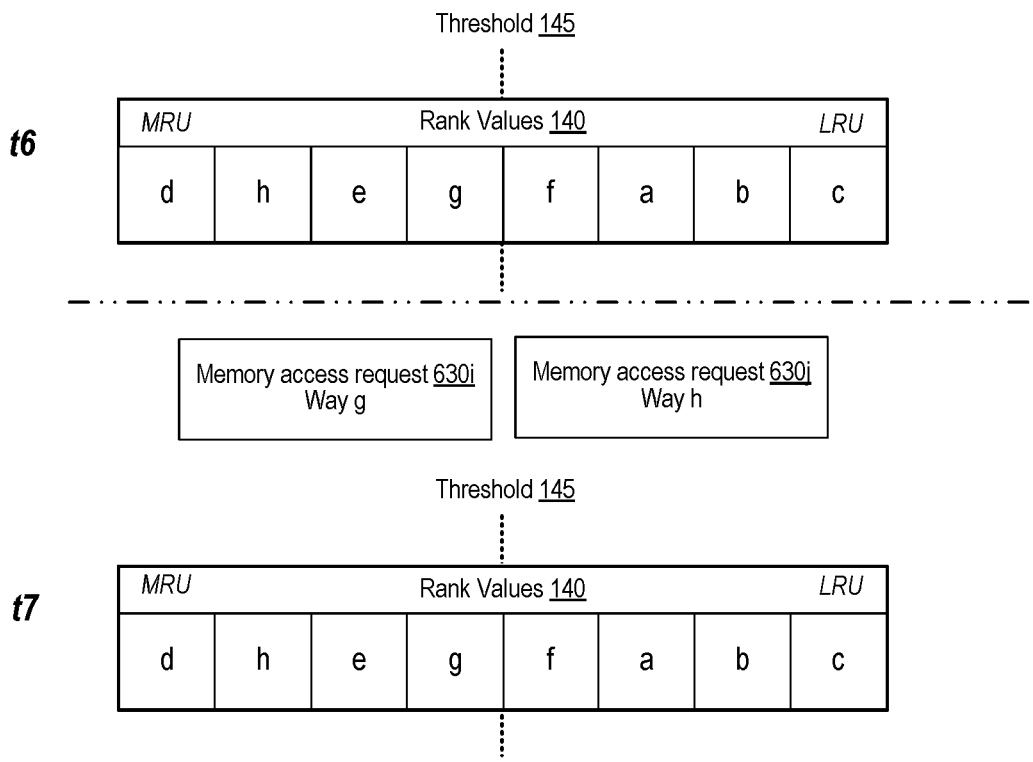
FIG. 6 depicts, at two more points in time, a state of the register for storing rankings of the plurality of cache ways shown in FIG. 3.

Turning now to FIG. 6, the embodiment of FIGS. 3-5 is depicted at two additional points in time subsequent to FIG. 5. Rank values 140 are shown starting at time t6 from FIG. 5 and at the subsequent time t7. The example of FIG. 6 demonstrates how a cache controller circuit operates in response to receiving two memory request in a single access cycle that both fail to satisfy the threshold value.

Rank values 140, as illustrated at time t6, form base rank values for cache ways 112a-112h at time t7. At time t7, cache controller circuit 101 receives memory access requests 630i and 630j. Memory access request 630i hits an entry in cache way 112g and memory access request 630j hits an entry in cache way 112h. In response to a determination that base rank values of cache ways 112g and 112h are above threshold value 145, cache controller circuit 101 maintains the rank values of cache ways 112g and 112h. As shown at time t7, rank value 140 does not change after receiving the two memory access requests 630i and 630j. It is noted that cache way 112d remains in the MRU position even though both cache ways 112g and 112h have been accessed more recently.

In other embodiments, cache controller circuit 101, in response to determining that base rank values of cache ways 112g and 112h are both above threshold value 145, may select the particular one of cache ways 112g and 112h with the lowest base rank value 140. As shown in the base rank values 140 at time t6, the base rank value of cache way 112g is lower than the base rank value of cache way 112h, and therefore, the rank value of cache way 112g may be promoted to the MRU position. In various embodiments, the rank value of the unselected cache way 112h may or may not be placed into a feedback register, such as previously described for the example of FIG. 4.

Figure 7:
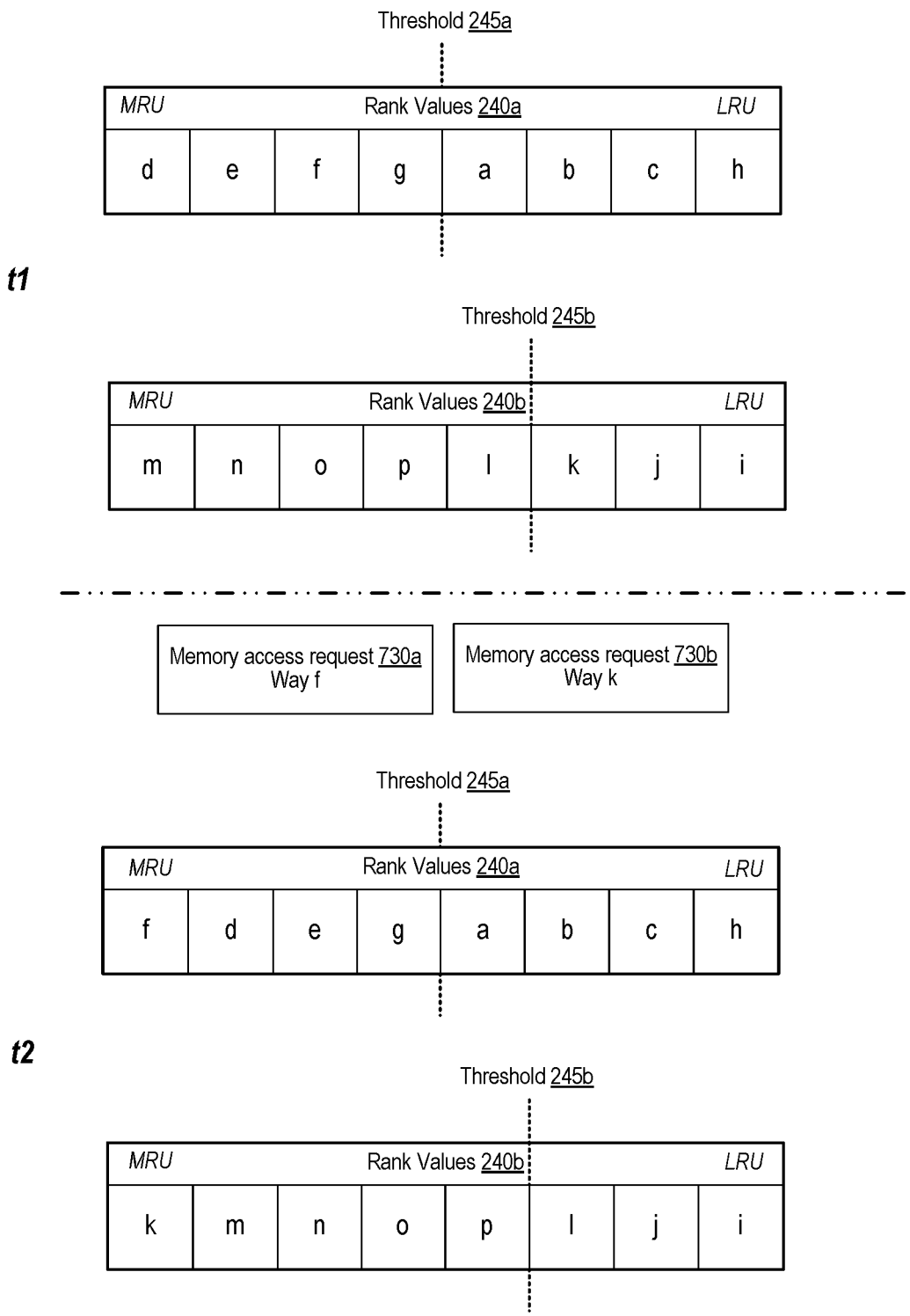
FIG. 7 illustrates, at two points in time, a state of two registers for storing rankings of a plurality of cache ways that are included in a plurality of cache sets in an embodiment of the cache subsystem of FIG. 2.

Proceeding now to FIG. 7, a block diagram of an embodiment of a portion of a cache subsystem with multiple cache sets, such as cache subsystem 200 in FIG. 2, is illustrated. As previously disclosed, cache memory 210 includes sixteen cache ways, cache ways 212a-212p. Cache ways 212a-212h are included in cache set 216a, while cache ways 212i-212p are included in cache set 216b. Two sets of rankings are maintained by cache controller circuit 201, rank values 240a tracks rank values for cache ways 212a-212h in cache set 216a, while rank values 240b tracks rank values for cache ways 212i-212p in cache set 216b. Rank values 240a and 240b are shown at two points in time, t1 and t2. Respective thresholds are depicted for each set of rank values. Threshold 245a is shown, in a similar manner as threshold value 145 in FIGS. 3-6, as being set midway in rank values 240a, with four positions on either side of threshold 245a. Threshold 245b is illustrated as being set closer to the LRU position than the MRU position. The example of FIG. 7 demonstrates how a cache controller circuit operates in response to receiving two memory request in a single access cycle, wherein each memory access request hits an entry in respective different cache sets.

At time t1, rank values 240a and 240b, as shown, depict base rank values for cache ways 212a-212p for time t2. In a different access cycle at time t2, cache controller circuit 201 receives memory access requests 730a and 730b. Memory access request 730a hits an entry in cache way 212f, which is in cache set 216a. Referring to rank values 240a, the base rank value of cache way 212f is above threshold 245a, and therefore, does not satisfy the threshold value. Memory request 730b hits an entry in cache way 212k, which is in cache set 216b. The base rank value for cache way 212k, as shown in rank values 240b, is below threshold 245b, and therefore satisfies the threshold value.

In response to a determination that respective memory locations for memory access requests 730a and 730b correspond to respective entries in different cache ways, each in a different cache set of cache sets 216a and 216b, cache controller circuit 201 increases the rank values of both cache ways 212f and 212k. Since memory access requests 730a and 730b hit in different cache sets, the rank values for the respective cache ways 212f and 212k are promoted regardless of the thresholds 245a and 245b. The threshold values are utilized when two or more memory access requests hit in a same cache set. Since, in the illustrated example of FIG. 7, memory access requests 730a and 730b hit in different ones of cache sets 216a and 216b, cache way 212f is promoted to the MRU position in rank values 240a and cache way 212k is promoted to the MRU position in rank values 240b.

If both of memory access requests 730a and 730b had hit entries in different cache ways in the same cache set, then cache controller circuit 201 would use the techniques described above to select one of the hit cache ways for promotion. For example, if memory access request 730a had hit an entry in cache way 212j in cache set 216b, then cache controller circuit 201 would use the described techniques to select cache way 212j for promotion to the MRU position. Cache way 212k, as well as other cache ways ranked above cache way 212k, would be demoted one position to open the MRU position for cache way 212j.

It is noted that the examples of FIGS. 3-7 are merely for demonstrating the disclosed techniques for maintaining rank values of cache ways by a cache controller circuit. Although each example limits the number of received memory access requests in a given access cycle to two, it is contemplated that the techniques can be applied to cases in which more than two memory access requests are received in a same access cycle. Furthermore, the number of cache ways and cache sets may differ in other embodiments.

Figure 8:
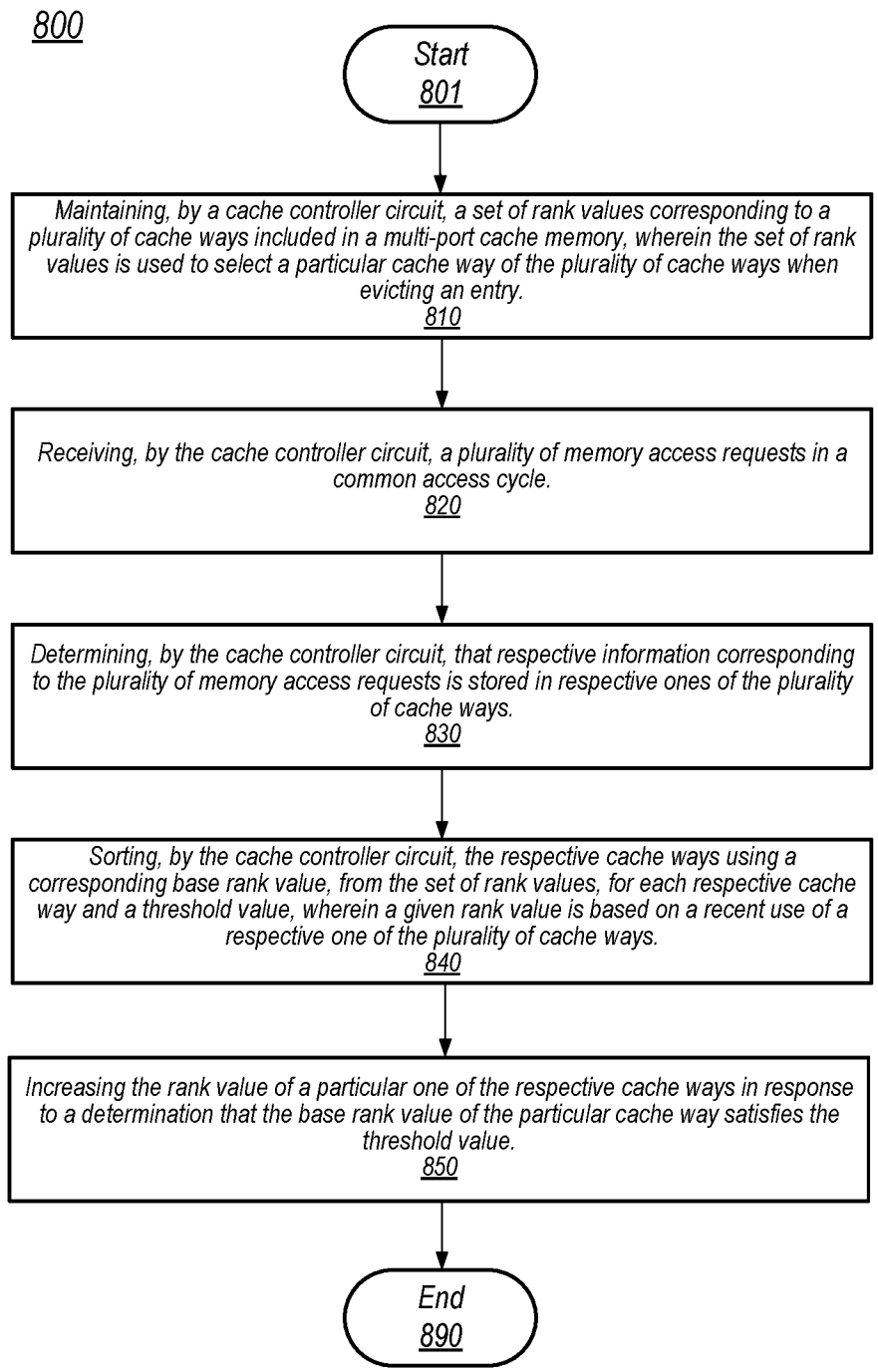
FIG. 8 shows a flow diagram of an embodiment of a method for maintaining a set of rank values in a cache subsystem.

Turning now to FIG. 8, a flow diagram for an embodiment of a method for maintaining rank values of cache ways in a cache memory is shown. Method 800 may be performed by a cache controller circuit of a cache subsystem, for example, cache controller circuit 101 in FIG. 1, or cache controller circuit 201 in FIG. 2. In some embodiments, cache controller circuit 101, for example, may access a non-transitory, computer-readable medium having program instructions stored thereon that are executable by a processor to cause cache controller circuit 101 to perform the operations described in regards to FIG. 8. Referring collectively to FIGS. 1 and 8, method 800 begins in block 801.

At block 810, method 800 includes maintaining, by a cache controller circuit, a set of rank values corresponding to a plurality of cache ways included in a multi-port cache memory. The set of rank values is used to select a particular cache way of the plurality of cache ways when evicting an entry. Cache controller circuit 101, as shown, maintains rank values 140. Rank values 140 include a plurality of positions, at least one position for each of cache ways 112a-112h. The positions range from a least recently (LRU) position to a most recently used (MRU) position to rank cache ways 112a-112h from the one that has been accessed most recently to the one that has been accessed least recently. After determining that a memory access request hits an entry in a particular cache way, the particular cache way is promoted to the MRU position. Rank values for other cache ways may be demoted by a position open the MRU position for the particular cache way.

Method 800 further includes, at block 820, receiving, by the cache controller circuit, a plurality of memory access requests in a common access cycle. As shown in FIG. 2, cache controller circuit 101 may receive multiple memory access requests in a same access cycle. Cache memory 110 is a multi-port memory, and therefore, is capable of servicing two or more access requests in a single access cycle.

At block 830, method 800 further includes determining, by the cache controller circuit, that respective information corresponding to the plurality of memory access requests is stored in respective ones of the plurality of cache ways. Cache controller circuit 101 determines, for each received memory access request, if the memory access request hits an entry in cache memory 110, and if a hit is determined, which of cache ways 112a-112h includes the hit entry.

Method 800 also includes, at block 840, sorting, by the cache controller circuit, the respective cache ways using a corresponding base rank value, from the set of rank values, for each respective cache way and a threshold value, wherein a given rank value is based on a recent use of a respective one of the plurality of cache ways. In some embodiments, method 800 includes promoting, by cache controller circuit 101, only one rank value in a given access cycle. If the plurality of memory access requests hit in two or more of cache ways 112a-112h, then cache controller circuit 101 selects one cache way for rank promotion. To make a selection, cache controller circuit 101 compares base rank values for each of the two or more cache ways to threshold value 145. Based on this comparison, cache controller circuit 101 determines if any of the two or more hit cache ways have a base rank value that satisfies threshold value 145.

Furthermore, method 800, at block 850, includes increasing the rank value of a particular one of the respective cache ways in response to a determination that the base rank value of the particular cache way satisfies the threshold value. If a single one of the two or more cache ways satisfies the threshold value, then that single cache way is selected, and the rank value of the selected cache way is promoted into the MRU position. Rank values for other cache ways may be demoted by shifting their respective rank value down by one position to open the MRU position for the selected cache way.

If none of the two or more cache ways have a base rank value that satisfies threshold value 145, then none of the base rank values are modified. In other embodiments, one of the two or more cache ways may be selected, as previously described, for promotion. If at least two cache ways of the two or more cache ways have a base rank value that satisfies threshold value 145, then the cache way with the lowest base rank value (the least recently used of the hit cache ways) is selected. In some embodiments, the one or more cache ways that satisfy threshold value 145, but are not selected, may be indicated by a feedback value, such as feedback 450 in FIG. 4. In such embodiments, the one or more cache ways indicated by the feedback value may be selected in a subsequent access cycle, such as an access cycle in which no memory access requests are received that hit in cache memory 110, or received memory requests hit in a cache way whose base rank value does not satisfy threshold value 145. The method ends in block 890.

It is noted that method 800 of FIG. 8 is merely an example. Variations of the disclosed methods are contemplated. For example, the maintaining of block 810 may occur in parallel with blocks 820-850.

Figure 9:
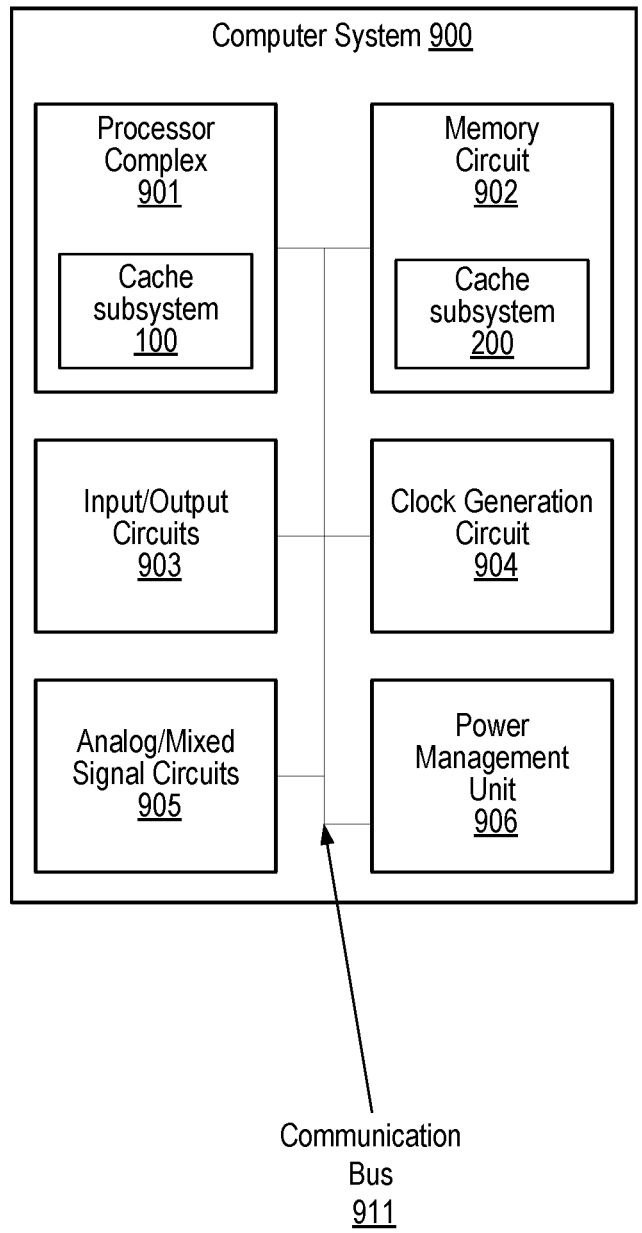
FIG. 9 depicts a block diagram of an embodiment of a computer system that includes a cache subsystem.

FIGS. 1-8 illustrate apparatus and methods for a cache controller circuit in a cache subsystem. Cache subsystems, such as those described above, may be used in a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 900 that includes the disclosed circuits is illustrated in FIG. 9. As shown, computer system 900 includes processor complex 901, memory circuit 902, input/output circuits 903, clock generation circuit 904, analog/mixed-signal circuits 905, and power management unit 906. These functional circuits are coupled to each other by communication bus 911. In various embodiments, memory circuit 902 and/or processor complex 901 may include respective embodiments of cache subsystem 100 or 200.

Processor complex 901, in various embodiments, may be representative of a general-purpose processor that performs computational operations. For example, processor complex 901 may be a central processing unit (CPU) such as a microprocessor, a microcontroller, an application-specific integrated circuit (ASIC), or a field-programmable gate array (FPGA). In some embodiments, processor complex 901 may correspond to a special purpose processing core, such as a graphics processor, audio processor, or neural processor, while in other embodiments, processor complex 901 may correspond to a general-purpose processor configured and/or programmed to perform one such function. Processor complex 901, in some embodiments, may include a plurality of general and/or special purpose processor cores as well as supporting circuits for managing, e.g., power signals, clock signals, and memory requests. In addition, processor complex 901 may include one or more levels of cache memory to fulfill memory requests issued by included processor cores.

Memory circuit 902, in the illustrated embodiment, includes one or more memory circuits for storing instructions and data to be utilized within computer system 900 by processor complex 901. In various embodiments, memory circuit 902 may include any suitable type of memory such as a dynamic random-access memory (DRAM), a static random access memory (SRAM), or a non-volatile memory such as a read-only memory (ROM), or flash memory, for example. It is noted that in the embodiment of computer system 900, a single memory circuit is depicted. In other embodiments, any suitable number of memory circuits may be employed. In some embodiments, memory circuit 902 may include a memory controller circuit as well communication circuits for accessing memory circuits external to computer system 900, such as a DRAM module, a hard drive or a solid-state drive. In some embodiments, non-volatile storage devices such as hard drives and solid-state drives may provide a non-transitory, computer-readable medium for storing program instructions executable by one or more processors in computer system 900, including, for example, one ore more cache controller circuits.

Input/output circuits 903 may be configured to coordinate data transfer between computer system 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 903 may be configured to implement a version of Universal Serial Bus (USB) protocol or IEEE 1394 (Firewire®) protocol.

Input/output circuits 903 may also be configured to coordinate data transfer between computer system 900 and one or more devices (e.g., other computing systems or integrated circuits) coupled to computer system 900 via a network. In one embodiment, input/output circuits 903 may be configured to perform the data processing necessary to implement an Ethernet (IEEE 802.3) networking standard such as Gigabit Ethernet or 10-Gigabit Ethernet, for example, although it is contemplated that any suitable networking standard may be implemented.

Clock generation circuit 904 may be configured to enable, configure and manage outputs of one or more clock sources. In various embodiments, the clock sources may be located in analog/mixed-signal circuits 905, within clock generation circuit 904, in other blocks with computer system 900, or come from a source external to computer system 900, coupled through one or more I/O pins. In some embodiments, clock generation circuit 904 may be capable of enabling and disabling (e.g., gating) a selected clock source before it is distributed throughout computer system 900. Clock generation circuit 904 may include registers for selecting an output frequency of a phase-locked loop (PLL), delay-locked loop (DLL), frequency-locked loop (FLL), or other type of circuits capable of adjusting a frequency, duty cycle, or other properties of a clock or timing signal.

Analog/mixed-signal circuits 905 may include a variety of circuits including, for example, a crystal oscillator, PLL or FLL, and a digital-to-analog converter (DAC) (all not shown) configured to generated signals used by computer system 900. In some embodiments, analog/mixed-signal circuits 905 may also include radio frequency (RF) circuits that may be configured for operation with cellular telephone networks. Analog/mixed-signal circuits 905 may include one or more circuits capable of generating a reference voltage at a particular voltage level, such as a voltage regulator or band-gap voltage reference.

Power management unit 906 may be configured to generate a regulated voltage level on a power supply signal for processor complex 901, input/output circuits 903, memory circuit 902, and other circuits in computer system 900. In various embodiments, power management unit 906 may include one or more voltage regulator circuits, such as, e.g., a buck regulator circuit, configured to generate the regulated voltage level based on an external power supply (not shown). In some embodiments any suitable number of regulated voltage levels may be generated. Additionally, power management unit 906 may include various circuits for managing distribution of one or more power signals to the various circuits in computer system 900, including maintaining and adjusting voltage levels of these power signals. Power management unit 906 may include circuits for monitoring power usage by computer system 900, including determining or estimating power usage by particular circuits.

It is noted that the embodiment illustrated in FIG. 9 includes one example of a computer system. A limited number of circuit blocks are illustrated for simplicity. In other embodiments, any suitable number and combination of circuit blocks may be included. For example, in other embodiments, security and/or cryptographic circuit blocks may be included.

Figure 10:
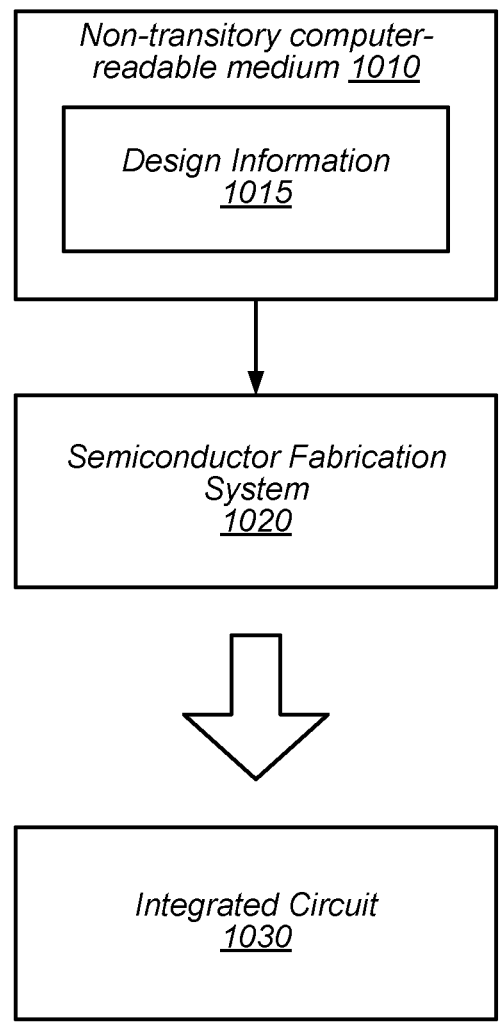
FIG. 10 illustrates a block diagram depicting an example computer-readable medium, according to some embodiments.

FIG. 10 is a block diagram illustrating an example of a non-transitory computer-readable storage medium that stores circuit design information, according to some embodiments. The embodiment of FIG. 10 may be utilized in a process to design and manufacture integrated circuits, such as, for example, an IC that includes computer system 900 of FIG. 9. In the illustrated embodiment, semiconductor fabrication system 1020 is configured to process the design information 1015 stored on non-transitory computer-readable storage medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof.

Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a multi-ported cache memory including a plurality of cache ways, each including a plurality of entries; and
    a cache controller circuit configured to:
        maintain a plurality of rank values, wherein a given rank value of the plurality of rank values corresponds to a given least recently used cache way of the plurality of cache ways and is used to select a particular cache way when evicting an entry;
        maintain a threshold value usable to classify the plurality of rank values;
        receive, in a common access cycle, first and second memory access requests for the cache memory;
        in response to a determination that the first memory access request and the second memory access request correspond to a first cache way and a second cache way, respectively, compare a corresponding rank values for the first and second cache ways to the threshold value; and
        based on the comparison, modify the rank value of a selected one of the first and second cache ways.

2. The apparatus of claim 1, wherein the cache controller circuit is further configured to increase the rank value of the selected cache way in response to a determination that a base rank value of the selected cache way satisfies the threshold value.

3. The apparatus of claim 1, wherein the cache controller circuit is further configured to decrease the rank value of an unselected one of the first and second cache ways in response to a determination that a base rank of the unselected cache way does not satisfy the threshold value.

4. The apparatus of claim 1, wherein, in response to a determination that a base rank value of an unselected one of the first and second cache ways satisfies the threshold value, the cache controller circuit is further configured to store an identifier for the unselected cache way.

5. The apparatus of claim 4, wherein, the cache controller circuit is further configured to increase the rank value of the unselected cache way in a subsequent access cycle.

6. The apparatus of claim 5, wherein the subsequent access cycle corresponds to an access cycle during which no memory access requests generate cache hits in cache ways with respective rank values that satisfy the threshold value are received by the cache controller circuit.

7. The apparatus of claim 1, wherein the cache controller circuit is further configured to, in response to a determination that the respective rank values for both the first and second cache ways satisfy the threshold value, select the one of the first cache way or the second cache way based on a comparison of the respective rank values of the first and second cache ways.

8. A method comprising:
maintaining, by a cache controller circuit, a set of rank values corresponding to a plurality of cache ways included in a multi-port cache memory, wherein the set of rank values is used to select a particular cache way of the plurality of cache ways when evicting an entry;
receiving, by the cache controller circuit, a plurality of memory access requests in a common access cycle;
determining, by the cache controller circuit, that respective information corresponding to the plurality of memory access requests is stored in respective cache ways of the plurality of cache ways;
sorting, by the cache controller circuit, the respective cache ways using a corresponding base rank value, from the set of rank values, for each respective cache way and a threshold value, wherein a given rank value is based on a recent use of a respective one of the plurality of cache ways; and
increasing, by the cache controller circuit, the rank value of a particular one of the respective cache ways in response to determining that the base rank value of the particular cache way satisfies the threshold value.

9. The method of claim 8, further comprising decreasing the rank value of a different cache way of the respective cache ways in response to a determination that a base rank of the different cache way does not satisfy the threshold value.

10. The method of claim 8, further comprising increasing the rank value of a different cache way of the respective cache ways in response to a determination that a base rank of the different cache way satisfies the threshold value.

11. The method of claim 8, further comprising storing an identifier for a different cache way of the respective cache ways in response to a determination that a base rank of the different cache way satisfies the threshold value.

12. The method of claim 11, further comprising increasing the rank value of the different cache way in a subsequent access cycle during which no memory access requests are received that generate cache hits in cache ways with respective rank values that satisfy the threshold value.

13. The method of claim 11, further comprising:
receiving, in a subsequent access cycle, a new memory access request corresponding to an entry in a given cache way, not included in the respective cache ways; and
increasing the rank value of the given cache way in response to determining that the base rank value of the given cache way is lower than the base rank value of the different cache way.

14. The method of claim 8, further comprising, in response to determining that the base rank values for the corresponding cache ways satisfy the threshold value, selecting the particular one of the respective cache ways with a lowest base rank value.

15. An apparatus, comprising:
a multi-ported cache memory including a plurality of cache sets, each cache set including a plurality of entries; and
a cache controller circuit configured to, for a particular one of the plurality of cache sets:

maintain respective rank values for a plurality of cache ways associated with the particular cache set, wherein a particular rank value is based on a recent use of a corresponding one of the plurality of cache ways;
maintain a threshold value usable to classify the plurality of cache ways associated with the particular cache set;
in a common access cycle, receive first and second memory access requests for memory locations that correspond to entries in respective first and second cache ways of the plurality of cache ways;
compare respective base rank values for the first and second cache ways to the threshold value; and
increase the rank value of the first cache way in response to a determination that the base rank value of the first cache way satisfies the threshold value.

16. The apparatus of claim 15, wherein the cache controller circuit is further configured to decrease the rank value of the second cache way in response to a determination that the base rank of the second cache way does not satisfy the threshold value.

17. The apparatus of claim 15, wherein the cache controller circuit is further configured to store an identifier for the second cache way in response to a determination that the base rank of the second cache way satisfies the threshold value and is greater than the base rank of the first cache way.

18. The apparatus of claim 15, wherein the cache controller circuit is further configured to:
in a different access cycle, receive third and fourth memory access requests, wherein a memory location for the third memory access request corresponds to an entry in a third cache way of the plurality of cache ways, and the fourth memory access request results in a cache miss;
in response to a determination that a base rank value of the third cache way satisfies the threshold value, increase the rank value of the third cache way; and
evict an entry in the cache way with a lowest rank value;
fill the evicted entry with information corresponding to the fourth memory access request; and
increase the rank value of the filled entry.

19. The apparatus of claim 15, wherein the cache controller circuit is further configured to:
in a different access cycle, receive third and fourth memory access requests wherein respective memory locations for the third and fourth memory access requests correspond to respective entries in third and fourth cache ways of the plurality of cache ways; and
in response to a determination that base rank values of the third and fourth cache ways are above the threshold value, maintain the rank values of the third and fourth cache ways.

20. The apparatus of claim 15, wherein the cache controller circuit is further configured to:
in a different access cycle, receive third and fourth memory access requests; and
in response to a determination that respective memory locations for the third and fourth memory access requests correspond to respective entries in third and fourth cache ways, each in a different cache set of the plurality of cache sets, increase the rank values of the third and fourth cache ways.

* * * * *